(12) United States Patent
Youngers

(10) Patent No.: US 6,247,085 B1
(45) Date of Patent: Jun. 12, 2001

(54) METHOD AND APPARATUS FOR REMOVABLE PERIPHERAL USER INTERFACE PANELS

(75) Inventor: Kevin J Youngers, Greeley, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/285,875

(22) Filed: Mar. 31, 1999

(51) Int. Cl.[7] .............................. G06F 13/38; G06F 13/40

(52) U.S. Cl. ................................. 710/126; 710/2; 710/8; 710/62; 710/63; 710/72; 710/73; 710/74; 710/129

(58) Field of Search .................................. 710/129, 8, 2, 710/62, 63, 72, 73, 74, 126

(56) References Cited

U.S. PATENT DOCUMENTS

| | | | |
|---|---|---|---|
| 5,787,259 | * 7/1998 | Haroun et al. | 709/253 |
| 5,987,106 | * 11/1999 | Kitamura | 379/110.01 |
| 5,987,590 | * 11/1999 | Wing So | 712/35 |
| 6,011,486 | * 1/2000 | Casey | 340/825.44 |
| 6,057,936 | * 5/2000 | Obara et al. | 358/296 |

* cited by examiner

*Primary Examiner*—Rupal Dharia
(74) *Attorney, Agent, or Firm*—Cynthia S. Mitchell

(57) ABSTRACT

A removable user interface panel for a peripheral device such as a scanner or copier is disclosed. The removable user interface panel may control or communicate with the peripheral device by means of a cable, a Universal Serial Bus device or hub, infrared or other known telecommunications means. The removable interface panel may also be attached to the end user's computer, monitor or keyboard for greater utility.

19 Claims, 5 Drawing Sheets

METHOD AND APPARATUS FOR REMOVABLE PERIPHERAL USER INTERFACE PANELS

FIELD OF THE INVENTION

The present invention relates generally to the field of user interface panels and more particularly to a method and apparatus for removing peripheral user interface panels.

BACKGROUND OF THE INVENTION

Scanners and other personal computer peripheral devices have user interface panels, which permit an end user to control the peripheral device. Typically, these user interface panels are located on a readily accessible front, top or front, side of the peripheral device. However, peripheral devices are generally used by end users in connection with the use of a personal computer. Therefore, it would be desirable if the end user could control scanners, printers and other peripheral devices without having to physically go to the peripheral device itself.

SUMMARY OF THE INVENTION

The above and other aspects of the present invention are accomplished in a method and apparatus for removable peripheral interface panels that may be placed near an end user's personal computer, monitor or keyboard for greater utility. Removable peripheral interface panels may interface with the peripheral device by means of cables; a Universal Serial Bus cable, device or hub; infrared transmissions; or other known telecommunication means.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
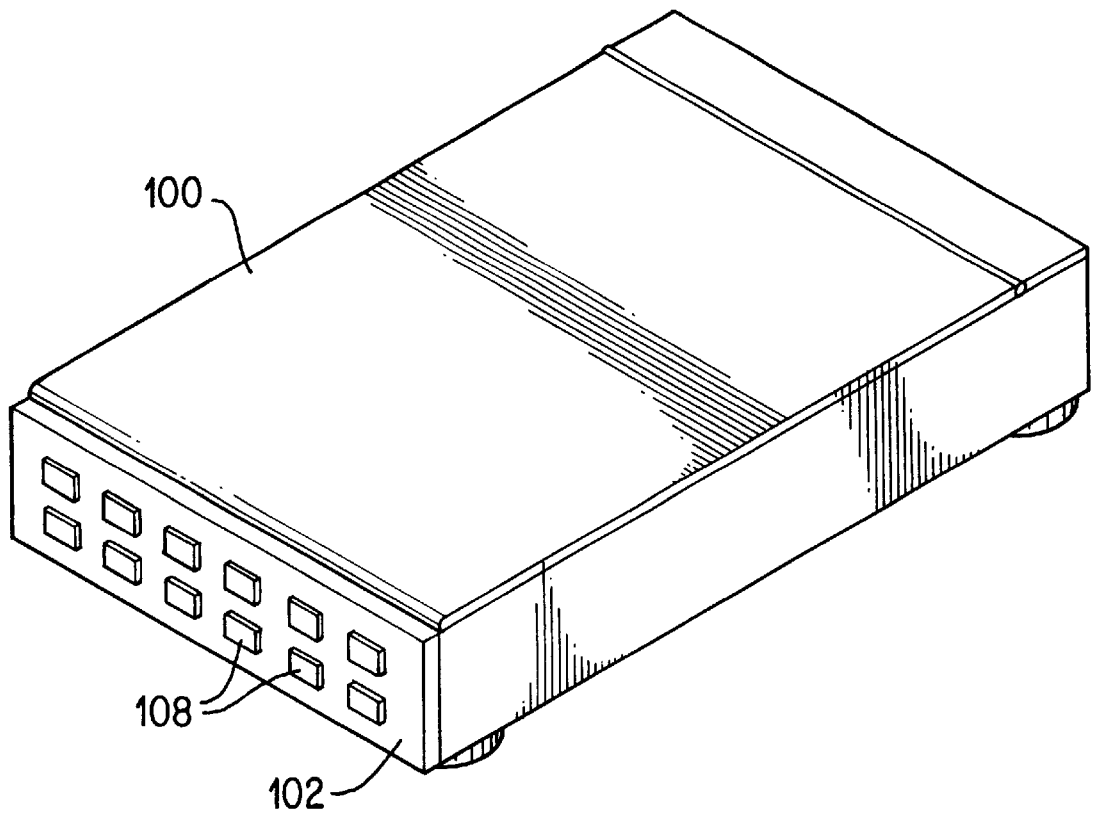
FIG. 1 shows a peripheral device such as a scanner with a removable control panel according to a first embodiment of the present invention.
Figure 2:
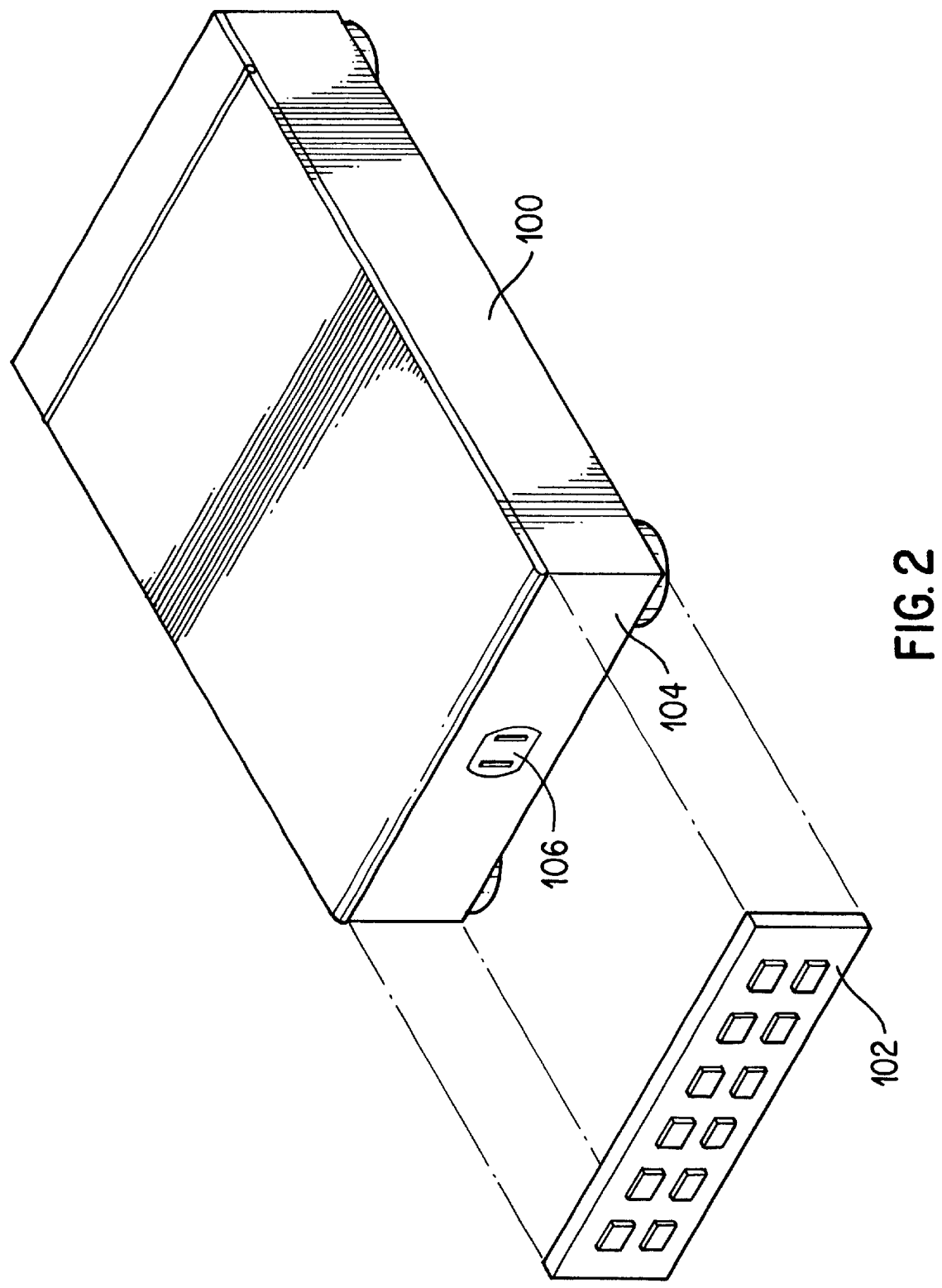
FIG. 2 shows a peripheral device such as a scanner with a removable control panel removed according to the first embodiment of the present invention.

FIGS. 1 and 2 illustrate a peripheral device 100 such as a scanner with a removable end user interface panel 102 with interface buttons 108. FIG. 2 illustrates the removable interface panel 102, removed from the peripheral device 100. There may be a socket 106 of the peripheral device 100 for plugging the interface panel 102 into the peripheral device 100.

Figure 3:
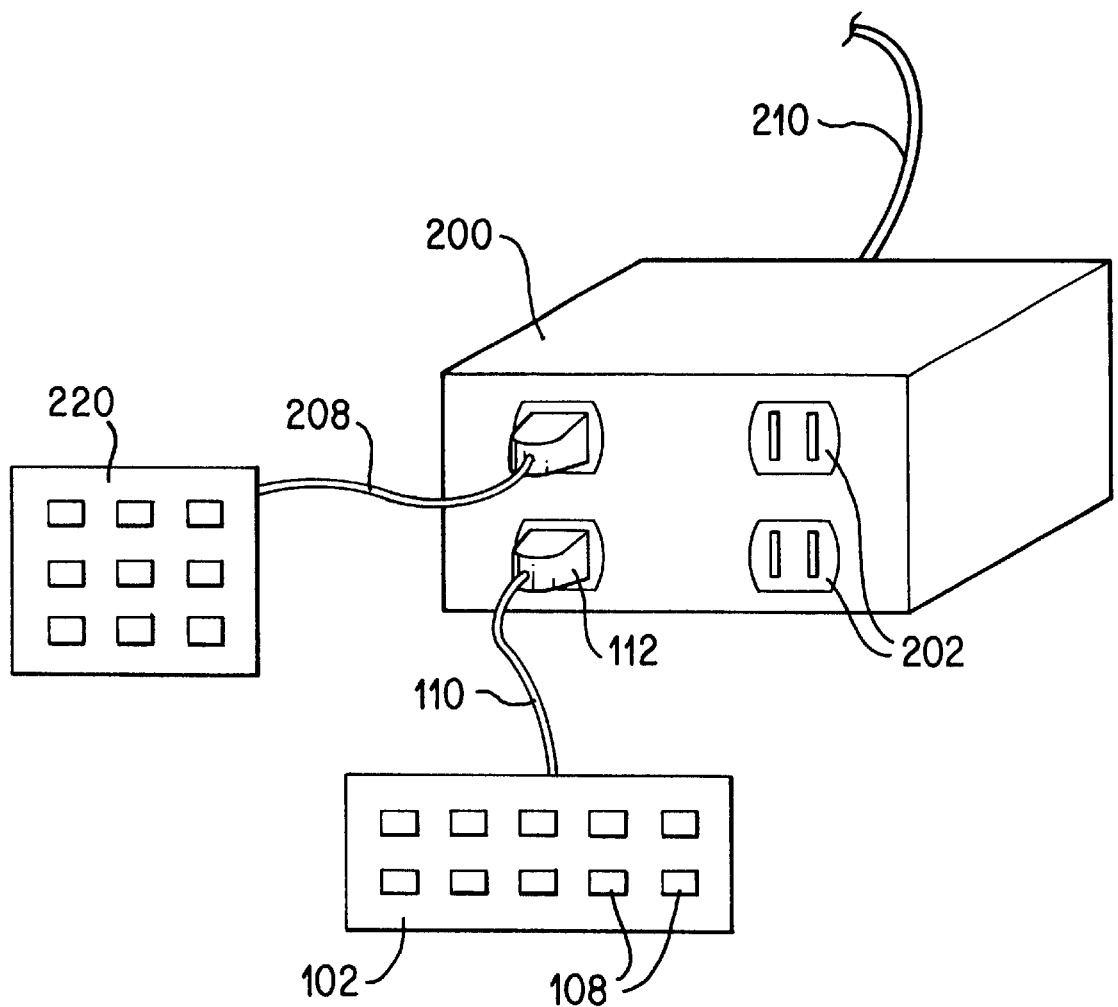
FIG. 3 shows a Universal Serial Bus hub connecting removable control panels from various peripheral devices according to a second embodiment of the present invention.

FIG. 3 illustrates removable interface panel 102 and other removable interface panels 220 connected to a Universal Serial Bus device or hub 200. The removable interface panels 102 and 220 are connected to the Universal Serial Bus device 200 by means of Universal Serial Bus cables 110 and 208 and any known plug or other connector means 112 into a receiving socket or connecting means 202. The Universal Serial Bus device or hub 200 may connect the various interface panels to a computer (not shown), a network (not shown), or to the individual peripheral devices (not shown) that the interface panels communicate with. In practice, the end user could communicate with, control or otherwise interact with one or more peripheral devices that are all connected via a common Universal Serial Bus device 200. The end user may control remote peripheral devices directly through the Universal Serial Bus device or by a host computer (not shown) that is also connected to the Universal Serial Bus device 200. The Universal Serial Bus may be connected to the remote peripheral devices by means of a Universal Serial Bus connection, a cable, modem, infrared, any other communication link or through a host computer 300.

Figure 4:
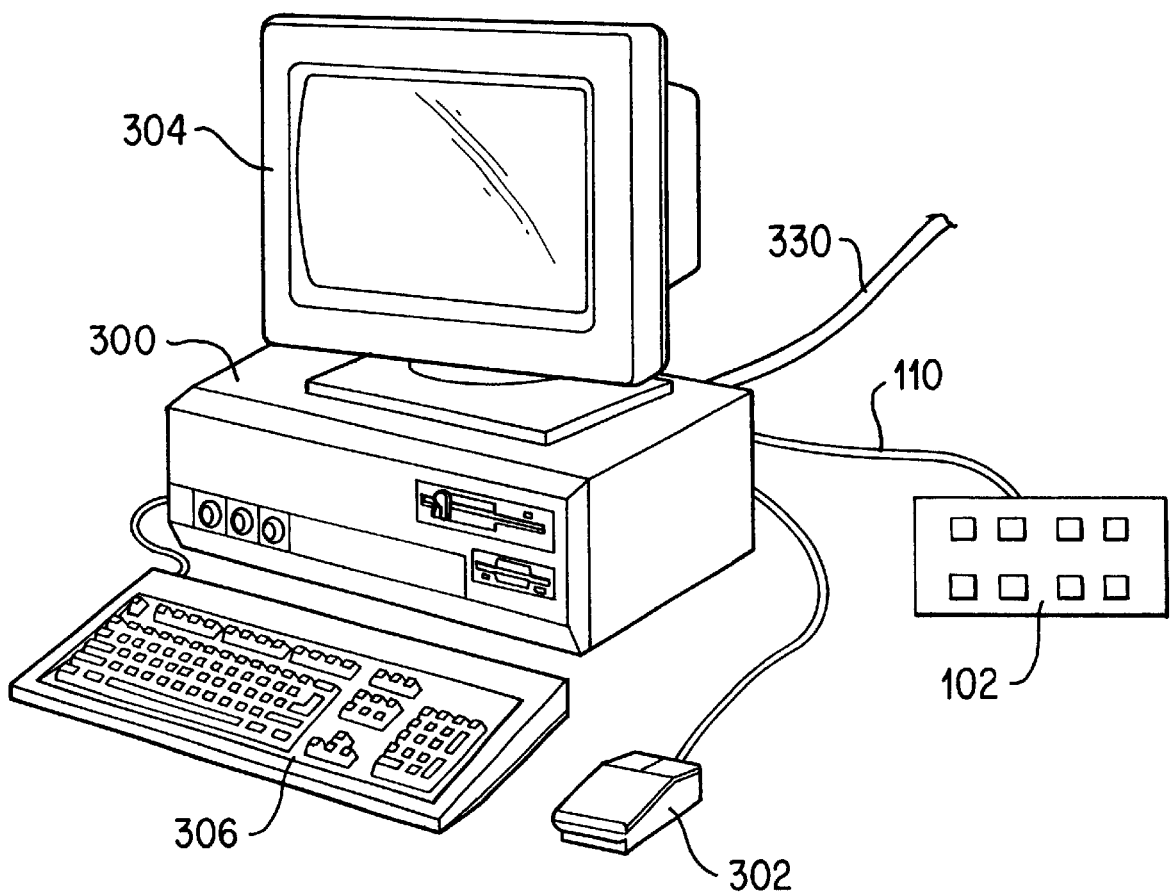
FIG. 4 shows a removable control panel of a peripheral device connected to a personal computer according to a third embodiment of the present invention.

FIG. 4 illustrates removable interface panel 102 connected to a host computer 300 having a monitor 304, a keyboard 306 and a mouse 302 by means of a Universal Serial Bus or cable 110. The end user may use the buttons on the interface panel 102 to control a remote peripheral device (not shown) through the host computer 300, which may be connected to the remote peripheral device by means of a Universal Serial Bus or cable 330, modem (not shown), infrared (not shown), any other communication link or through the host computer 300.

Figure 5:
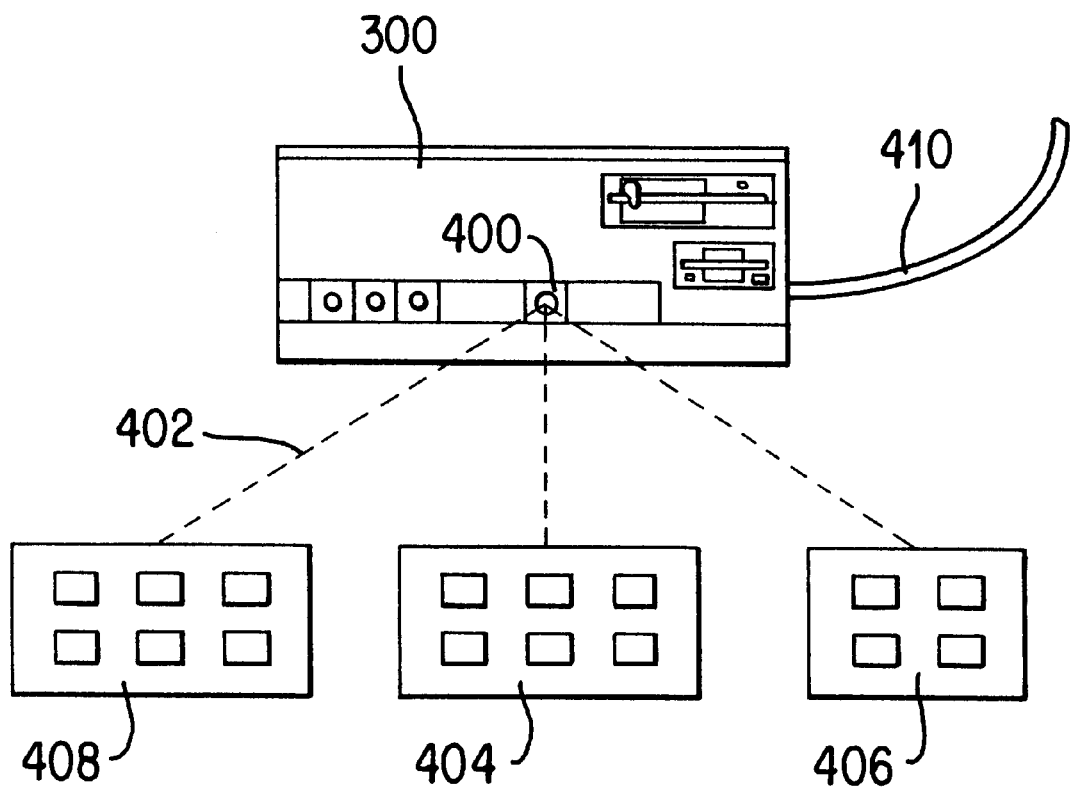
FIG. 5 shows a personal computer with an infrared communication port for communicating with removable control panels from various peripheral devices according to a fourth embodiment of the present invention.

FIG. 5 illustrates removable interface panel 108 and several other removable interface panels 404 and 406. The removable interface panels 108, 404, and 406 communicate with a host computer 300 by means of infrared transmitter/transceiver ports (not shown) on the interface panels 108, 404, and 406 and an infrared transmitter/transceiver port 400 on the host computer 300. The end user may enter desired commands onto the interface panels by means of control buttons on the interface panels 108, 404, and 406. The interface panels will then communicate the desired commands to the host computer 300 by means of infrared transmission. The host computer 300 will then communicate the desired commands to the corresponding peripheral device (not shown) by means of a Universal Serial Bus or cable 410, modem, infrared, any other communication link or through the host computer 300.

The present invention permits a user interface panel 108 on a peripheral device, such as a scanner 100 to be physically removed from the peripheral device 100 and located at a more useful location, such as on the end user's computer, monitor, keyboard or desk top. The end user may then control the remote peripheral device 100 remotely with the commands being transmitted to the peripheral device 100 by means of a Universal Serial Bus, a cable, infrared transmission, any other communication link or through the host computer 300.

The foregoing description of the present invention has been presented for purposes of illustration and description. It is not intended to be exhaustive or to limit the invention to the precise form disclosed, and other modifications and variations may be possible in light of the above teachings. For example, a peripheral device 100 may have more than one user interface panel that several end users may be able to control from their own desk tops. In such a case, there would need to be a priority hierarchy for commands or a FIFO system for handling the commands received by the peripheral device 100. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A peripheral device comprising:
   a removable user interface panel; and
   a means for said removable user interface panel to communicate with said peripheral device.

2. The peripheral device according to claim 1, wherein said means for said removable user interface panel to communicate with said peripheral device comprises a Universal Serial Bus.

3. The peripheral device according to claim 1, wherein said means for said removable user interface panel to communicate with said peripheral device comprises a Universal Serial Bus device.

4. The peripheral device according to claim 1, wherein said means for said removable user interface panel to communicate with said peripheral device comprises a Universal Serial Bus hub.

5. The peripheral device according to claim 1, wherein said means for said removable user interface panel to communicate with said peripheral device comprises a cable.

6. The peripheral device according to claim 1, wherein said means for said removable user interface panel to communicate with said peripheral device comprises an infrared communication channel.

7. The peripheral device according to claim 1, wherein said means for said removable user interface panel to communicate with said peripheral device comprises a telecommunications communication channel.

8. The peripheral device according to claim 1, wherein said removable user interface panel is attachable to a computer.

9. The peripheral device according to claim 1, wherein said removable user interface panel is attachable to a monitor.

10. The peripheral device according to claim 1, wherein said removable user interface panel is attachable to a keyboard.

11. A method of controlling a peripheral device, said method comprising:
    providing said peripheral device having a user interface panel attached thereto;
    removing said user interface panel from said peripheral device;
    establishing communication between said user interface panel and said peripheral device while said user interface panel remains removed from said peripheral device; and
    controlling said peripheral device with said user interface panel after said establishing communication between said user interface panel and said peripheral device.

12. The method of claim 11 and further comprising:
    controlling said peripheral device with said user interface panel before said removing said user interface panel from said peripheral device.

13. The method of claim 11 wherein said establishing communication between said user interface panel and said peripheral device comprises connecting said user interface panel to a Universal Serial Bus.

14. The method of claim 11 wherein said establishing communication between said user interface panel and said peripheral device comprises operatively connecting said user interface panel to a computer and operatively connecting said computer to said peripheral device.

15. The method of claim 11 wherein said providing said peripheral device having a user interface panel attached thereto comprises providing said peripheral device having a physical attachment and an electrical connection to said user interface panel.

16. The method of claim 15 wherein said removing said user interface panel from said peripheral device comprises disconnecting said physical attachment and said electrical connection.

17. A system comprising:
    a peripheral device;
    a user interface panel capable of controlling said peripheral device;
    wherein said system has at least a first operating condition and a second operating condition;
    wherein, in said first operating condition:
        a direct physical attachment exists between said user interface panel and said peripheral device; and
        a direct electrical connection exists between said user interface panel and said peripheral device;
    wherein, in said second operating condition:
        said direct physical attachment does not exist between said user interface panel and said peripheral device;
        said direct electrical connection does not exist between said user interface and said peripheral device; and
        an indirect electrical connection exists between said user interface panel and said peripheral device.

18. The system of claim 17 wherein said indirect electrical connection comprises a Universal Serial Bus.

19. The system of claim 17 wherein said indirect electrical connection comprises a computer.

* * * * *